Figures 1, 1A:
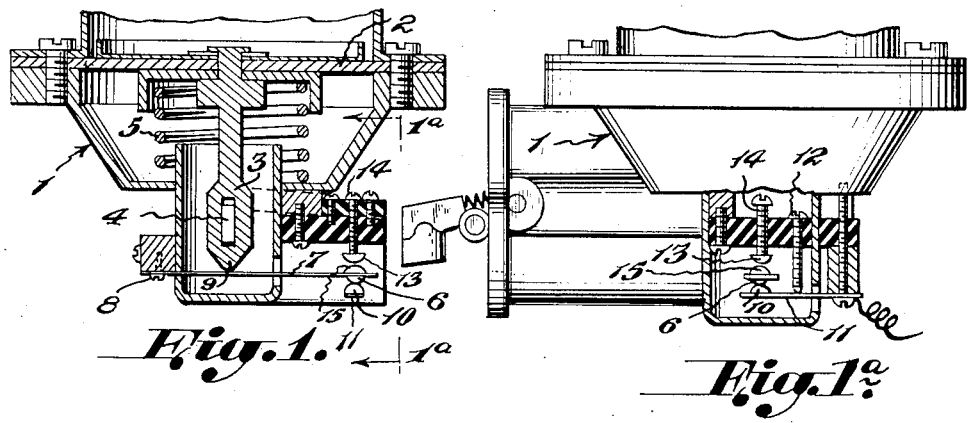

Sept. 21, 1943.  L. T. E. THOMPSON  2,330,159
MILES PER GALLON GAUGE
Filed March 11, 1940  2 Sheets-Sheet 1

Inventor,
Louis T. E. Thompson
Henry C. Parker.
By:  Attorney.

Sept. 21, 1943.    L. T. E. THOMPSON    2,330,159
MILES PER GALLON GAUGE
Filed March 11, 1940    2 Sheets-Sheet 2

Inventor;
Louis T. E. Thompson
By: Henry C. Parker
Attorney.

Patented Sept. 21, 1943

2,330,159

UNITED STATES PATENT OFFICE 2,330,159

MILES PER GALLON GAUGE

Louis T. E. Thompson, Dahlgren, Va., assignor of one-third to Henry C. Parker, Washington, D. C., and one-fourth to Ernest L. Welch, Dahlgren, Va.

Application March 11, 1940, Serial No. 323,453

9 Claims. (Cl. 73—51)

This invention relates to miles per gallon gauges; and it comprises a gauge which, when installed in an automobile, for example, is capable of measuring instantaneous miles traveled per gallon of fuel consumed. This gauge comprises in combination a displacement fuel pump, usually a diaphragm pump, which serves to pump the fuel and which is actuated at a rate which is directly proportional to the rate of travel of the automobile, the diaphragm of the pump being mounted on and actuated by a pedestal the stroke of which is substantially directly proportional to the rate of flow of fuel, at least one pair of electric contact elements at least one of which is mounted on a spring directly actuated by contact with said pedestal, which elements are disposed in such fashion that the contacts are closed at each stroke of the pump for a time interval which is a function of the length of stroke of said pump, an electric circuit including said pair of contacts, an electric heating element, a source of current and a meter for converting the heat generated in said heating element into a reading of miles per gallon; all as more fully hereinafter set forth and as claimed.

In a copending application, Serial No. 244,481, filed December 7, 1938, now Patent No. 2,282,438, I have described how the usual diaphragm pump employed in automobiles can be used to operate an instantaneous miles per gallon gauge, owing to the fact that the length of the stroke of this pump is inversely proportional to instantaneous miles per gallon. The gauge described in said application is operated by a means connected to the pump diaphragm in such fashion that the displacement of said means from its normal, noflow position (the diaphragm being in its lowest position) is a measure of the stroke of the pump, this means being employed to operate a meter. This gauge has proved to be accurate and practical in operation, but I have now found that the design of the operating parts of such a gauge can be greatly simplified by the use of a different principle of operation.

I have found that the pump diaphragm of the usual fuel pump of an automobile can be made to operate a pair of electrical contacts in such fashion that the total time said contacts are closed per unit of time is a measure of the length of stroke of the pump. When these contacts are placed in series with a heating element in an electric circuit, therefore, the heat generated in the heating element is a measure of the miles per gallon. The heat generated can then be employed to actuate a meter calibrated in miles per gallon. Or a sluggish galvanometer can be used.

Figure 2:
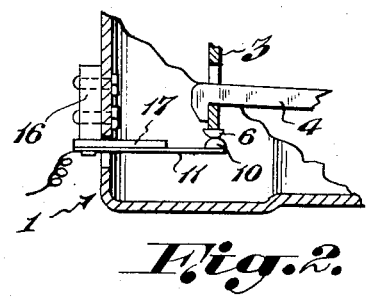
Figure 3:
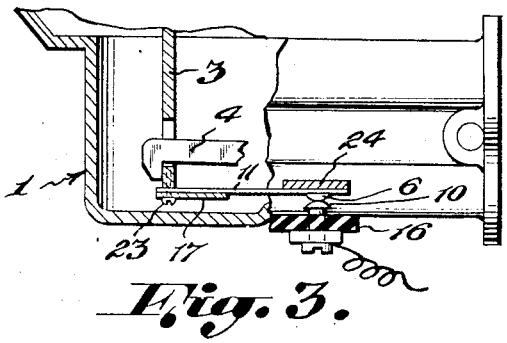
Figure 4:
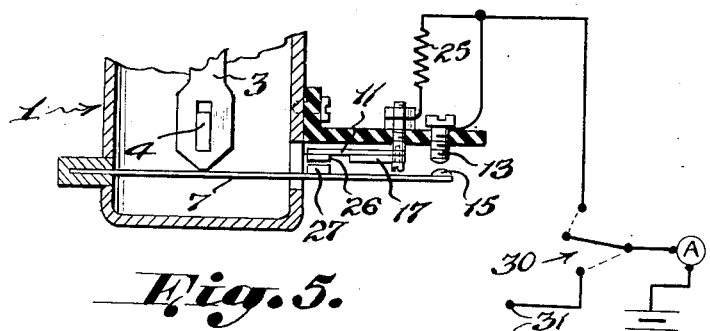

My invention can be explained in somewhat more detail by reference to the accompanying drawings which show, more or less diagrammatically, several embodiments of a miles per gallon gauge operated in accordance with the present invention. In this showing Fig. 1 is a partial vertical section through the center of a diaphragm fuel pump showing the operating elements of my gauge attached thereto, Fig. 1a is a partial vertical section of the same pump taken at right angles to the showing of Fig. 1, along the line 1a—1a of that figure, Fig. 2 is a partial vertical section of the lower part of a fuel pump, showing a simpler form of the operating elements of my gauge, Fig. 3 is a partial vertical section through the lower part of a fuel pump showing a modification in which a weight is mounted on the contact spring in order to give it inertia, Fig. 4 is a similar showing of still another modification, Fig. 5 is a diagram showing curves which illustrate the operation of my gauge, while Fig. 6 is a connection diagram which can be used in my gauge.

In the various figures like parts are designated by like reference numerals. Referring to Figs. 1 and 2, the lower part of the pump casing is shown generally at 1 while the pump diaphragm is shown at 2, this diaphragm being clamped between the upper and lower castings of the pump. The pedestal or operating rod of the pump is shown at 3, this being operated as usual by the driving link 4 which is connected indirectly to the main drive shaft of the automobile and is operated at a rate directly proportional to the speed of the automobile, for any one gear ratio.

The diaphragm, pedestal and driving link are shown in the various figures in the lowest or noflow position of the pump but during operation of the automobile the diaphragm 2 and pedestal 3 are raised, by the joint action of the spring 5 and the vacuum in the fuel line, in a series of rapid vibrations which serve to pump fuel to the engine. The driving link is attached to the pedestal, as usual, in such manner that it tends to force the diaphragm downwardly only. The height to which the diaphragm and the pedestal are raised from their lowest position measures the stroke of the fuel pump and therefore determines the quantity of fuel supplied to the engine.

Figure 5:
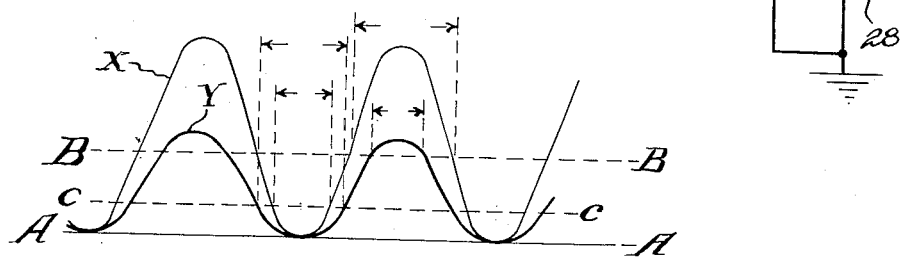
Figure 6:
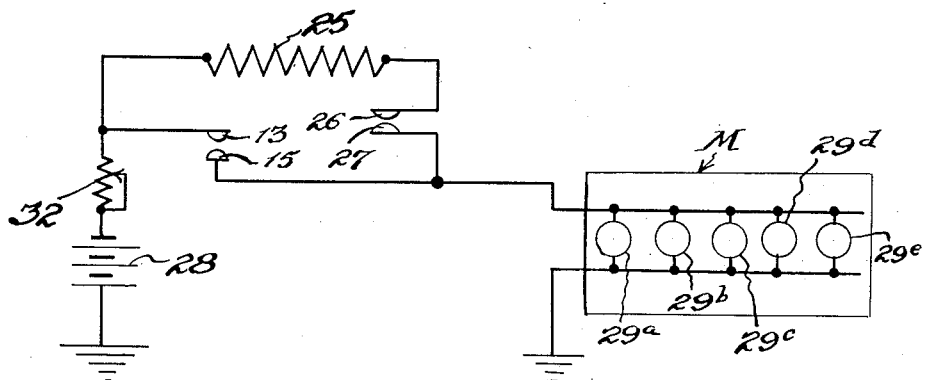

The principle of operation of my device can be explained most easily from Fig. 5. In this figure the two curves X and Y represent diagrammatically the movements or vibrations of the diaphragm of the fuel pump as a function of time, the time being measured along the horizontal axis. The line A—A represents the base line or lowest position of the diaphragm. Curve X represents a condition in which the diaphragm is vibrating through a wide amplitude and hence delivering fuel to the engine in large quantities, while Y represents the condition where the diaphragm is vibrating with a lower amplitude. It will be noted that, in the vicinity of the base line, along line C—C, for example, curve Y has loops which are wider than those of curve X, whereas, at the upper limit of motion of the diaphragm, in the vicinity of line B—B, the opposite is true. The width of these loops is therefore a function of the amplitude of the vibration of the diaphragm and hence of the instantaneous miles per gallon. It is evident, therefore, that if a pair of electric contacts is closed at each vibration of the diaphragm for a time interval which corresponds to the width of the loops indicated in Fig. 5 and if these contacts are used to make and break a heating circuit, the quantity of heat generated per unit of time will be a function of the instantaneous miles per gallon. This is the principle on which my miles per gallon gauge operates.

I attach or connect one contact element of a pair of contacts to the diaphragm or to the pedestal of the fuel pump in such fashion that the time of closure during each vibration of the diaphragm corresponds to the width of the loops indicated in the figure. If the contacts are arranged in such fashion that closure is effected as the diaphragm approaches the base line A—A, as along the line C—C, for example, it is evident that the more fuel supplied to the engine, that is, the larger the amplitude of vibration of the diaphragm, the less the total time of contact per unit of time, whereas, if the contact is arranged in such fashion that it is made only as the diaphragm approaches the upper limit of its motion, as along the curve B—B, for example, the more fuel supplied to the engine, the longer the total time of contact per unit of time. My miles per gallon gauge can be operated in either of these ways by proper calibration of the meter.

The electric circuit which includes the electric contact elements of this invention also includes a heating element, such as the hot wire of a hot wire ammeter mounted on the dash of an automobile. No change of resistance occurs in the electric circuit. The principle employed is therefore that of change of heating with the time the current is on; in effect there is a change of time-average current. The equation which represents the effect obtained can be written as follows:

Length of stroke $\alpha H = RI^2 \cdot \frac{t}{T}$ where H is heat generated per unit of time and $t/T$ is the fraction of the time during which the current is on, $t$ being the on-period during one cycle and T being the time of the cycle, while I is the current.

There are various ways in which one of the electrical contact elements of this invention may be connected to the pump diaphragm. In Figs. 1 and 1a the moving contact element 6 is mounted on a leaf spring 7 which is secured to the pump casing at 8. The bottom point 9 of the pedestal 3 presses against the top of the leaf spring and, as the diaphragm approaches its lowest or no-flow position, the movable contact 6 is pressed against the substantially stationary contact 10. The latter contact is mounted on an auxiliary leaf spring 11 which may be positioned at right angles to the spring 7, as shown in Fig. 1a. It is advisable to have both contact elements mounted on leaf springs in this manner in order that a slight wiping movement shall be produced which tends to keep the contact clean. The set screw 12 serves to adjust the height of the contact 10 to the point at which best results are secured. A second stationary contact element 13 is provided, this being mounted at the end of the screw 14 and registering with contact 15 mounted on top of leaf spring 7. It is evident from the preceding discussion that either pair of contacts may be used, that is 6 and 10 or 13 and 15, in order to provide a reading of instantaneous miles per gallon in accordance with this invention. The stationary contact which is not connected in the electric circuit can be used as a stop to limit the movement of the leaf spring and hence to prevent this spring from vibrating at its own frequency.

An entirely different method of mounting the contacts is shown in Fig. 2 in which contact 6 is mounted directly on the bottom of the pedestal 3. The quasi-fixed contact 10 in this embodiment is mounted on leaf spring 11 which is secured to the side of casing 1 by means of insulated block 16. It will be noted that a short bar 17 is mounted above the leaf spring 11. This bar serves to prevent vibrations of the spring 11 by acting as a stop element at the midpoint of vibration.

In the embodiment illustrated in Fig. 3 the leaf spring 11 is mounted directly on the base of the pedestal 3 by means of screw 23. Contact 6 is mounted on the opposite end of this spring and cooperates with stationary contact 10 which is mounted on insulating block 16, as shown. The leaf spring is provided with bar 17, which serves as a damping means, and also with an inertia disc 24 which serves to give the spring 11 a low natural frequency, so low that the spring does not tend to vibrate at a rate as great as that of the pedestal 3 even at lowest engine speeds. The weight required to produce this condition can be readily calculated or can be found by test. The high inertia of the spring 11 prevents the contacts 6 and 10 from remaining closed. The break occurs just after the spring starts to move upwardly and, on the down stroke, contact is made before the end of the stroke, owing to the fact that the weight 24 makes the spring lag behind the pedestal. The duration of contact thus increases as a fraction of the cycle as the amplitude of vibration of the diaphragm decreases.

The embodiment of Fig. 4 is quite similar to that of Figs. 1 and 1a with the exception that two pairs of contacts are employed, one pair (26 and 27) connected in series with the resistance 25. Auxiliary contact elements 26 and 27 are adjusted in such fashion that, upon the upward motion of the pedestal 3, these are closed before the contacts 13 and 15. This means that the hot wire ammeter shown at A, is first connected to the source of current 28 through the resistance 25 and later, if the displacement of the pedestal is sufficient, directly to the source of current. This means that, the greater the displacement of the diaphragm of the pump, the more current passes through the ammeter. It will be noted that auxiliary contact 26 is mounted on leaf spring 11.

I have shown generally a switch 30 in Fig. 4, which enables the ammeter A to be used either as a miles per gallon gauge, in accordance with the present invention, or as a gasoline gauge, according to the setting of the switch. The connections 31 are attached to the usual gasoline gauge leads. I have found that the usual gasoline gauge can serve this double purpose when provided with a miles per gallon scale.

In Fig. 6 there is shown a modified wiring diagram, which can be employed with my miles per gallon gauge, as well as a modifier meter, shown generally at M. This meter comprises a series of lamps 29a to 29e having resistances which vary from one end of the series to the other. These lamps are adapted to light up consecutively in accordance with the miles per gallon reading. The current through the lamps is usually varied, by adjustment of rheostat 32, to the point at which only one lamp is lit when the miles per gallon corresponds to the poorest possible performance of the automobile to which the gauge is attached, provided that a gauge of type similar to that of Figs. 1 to 3 is used. If the gauge is like that of Fig. 4 additional lamps would come on as the miles/gal. decreases and only one lamp would light for the best miles/gal. An estimate of miles per gallon can thus be readily obtained. These lamps may be colored differently if desired, one lamp being red to indicate operating difficulties which might be caused by ignition trouble or the like.

In the wiring diagram of Fig. 6 two pairs of contacts are employed, as in the embodiment of Fig. 4, one of the contact pairs being in series with the resistance 25. The contacts 26 and 27, which are in series with this resistance, are closed first and then this resistance is short circuited when contacts 13 and 15 are closed. Rheostat 32 is in series with both pairs of contacts. The meter M is, of course, adapted to be mounted on the dash of the automobile.

Any of the modifications which have been described can be used to give an indication of instantaneous miles per gallon with sufficient accuracy for ordinary purposes. My experience with these gauges shows that a reading of instantaneous miles per gallon is very valuable in showing how the fuel pump is working at any time, for example during the condition of idling. At very low engine speeds it usually shows a condition of intermittent pumping. The gauge is equally valuable when the car is in the garage for testing and adjustment and on the road either as an index of the condition or quality of the fuel used, the performance of the ignition system and as a guide to efficient and safe driving. It is remarkable how much one can learn about the working of the fuel system by watching the gauge at various speeds on hills and down grades and on various types of roads. On a hilly, dirt road, for example, my gauge shows a gasoline consumption which is substantially greater than on a paved, level road.

While I have described what I consider to be the best embodiments of my gauge, it is evident of course that many modifications can be made in the specific structures described without departing from the purview of this invention. Thus, while I have described an electric meter which is operated by the heat generated in a heating element, it is evident that any type of meter can be used which is adapted to give a reading with a pulsating current, which reading varies with the average time the current is on. For example a sluggish, fairly slow-moving, ammeter or galvanometer of long period, capable of operating on a pulsating current, can be employed in place of the hot wire ammeter which has been described. It is only necessary that the instrument be capable of indicating the time integrated effect of the current passing between the contact elements of this invention, this indication being converted into a reading of miles per gallon by proper calibration of the instrument. The moving contact element of this invention can be attached to the actuating element of the fuel pump in any suitable manner, provided that the time of contact is a function of the stroke of said actuating element. Other modifications which fall within the scope of the following claims will be immediately evident to those skilled in this art.

What I claim is:

1. A miles per gallon gauge for indicating the instantaneous miles traveled per gallon of fuel consumed by a vehicle equipped with a fuel pump having an operating diaphragm which serves to pump the fuel and which is actuated at a rate which is directly proportional to the rate of travel of the vehicle, the diaphragm being mounted on and actuated by a pedestal the stroke of which is substantially directly proportional to the rate of flow of fuel; which comprises at least one pair of electrical contact elements, at least one of said elements being mounted on a spring directly actuated by contact with said pedestal, the contact elements being so disposed that they are closed at each stroke of the pedestal for a time interval which is a function of the length of stroke of said pedestal, and an electric indicating circuit including said contact elements mounted in series with at least one electric heating element of a hot-wire indicating instrument reading in miles per gallon and actuated in accordance with the time integrated effect of the current passing between said pair of contacts.

2. The miles per gallon gauge of claim 1 wherein said indicating instrument is a hot-wire ammeter.

3. The miles per gallon gauge of claim 1 wherein said indicating instrument comprises a plurality of lamps adapted to light up at different values of miles per gallon.

4. The miles per gallon gauge of claim 1 wherein the spring serving as a mounting for said contact element is mounted on the bottom of said pedestal.

5. The miles per gallon gauge of claim 1 wherein the spring serving as a mounting for said contact element is mounted so as to press against the bottom of said pedestal and to be operated thereby.

6. The miles per gallon gauge of claim 1 wherein another spring is provided for mounting the second of said contact elements, one of said springs being actuated by said pedestal.

7. The miles per gallon gauge of claim 1 wherein the spring serving as a mounting for said contact element is provided with means for preventing it from vibrating freely.

8. A miles per gallon gauge for indicating the instantaneous miles traveled per gallon of fuel consumed by a vehicle equipped with a fuel pump having an operating diaphragm which serves to pump the fuel and which is actuated at a rate which is directly proportional to the rate of travel of the vehicle, the diaphragm being mounted on and actuated by a pedestal the stroke of which is substantially directly proportional to the rate of flow of fuel; which comprises at least one pair of electrical contact elements, at least one of said elements being mounted on a spring directly actuated by contact with said pedestal, the contact elements being so disposed that they are closed at each stroke of the pedestal for a time interval which is a function of the length of stroke of said pedestal, and an electric indicating circuit including said contact elements, a source of current and a meter calibrated both in miles per gallon and gallons of fuel, and means for switching said meter to the usual fuel gauge connections.

9. A miles per gallon gauge for indicating the instantaneous miles traveled per gallon of fuel consumed by a vehicle equipped with a fuel pump having an operating diaphragm which serves to pump the fuel and which is actuated at a rate which is directly proportional to the rate of travel of the vehicle, the diaphragm being mounted on and actuated by a pedestal the stroke of which is substantially directly proportional to the rate of flow of fuel; which comprises two pairs of electric contact elements, one contact of each pair being mounted on a spring which is directly actuated by said pedestal, an electric circuit including said contact elements, a resistance, connected in series with one of said pairs of contact elements and in shunt with the second pair, a source of current and the heating element of a hot-wire indicating instrument, the electric connections being such that the circuit through said heating element is first closed through said first pair of contact elements and said resistance and is then closed through the second pair of contact elements, thereby shorting said resistance.

LOUIS T. E. THOMPSON.